United States Patent
Wang et al.

(10) Patent No.: US 11,278,875 B2
(45) Date of Patent: Mar. 22, 2022

(54) DIRECT SYNTHESIS OF METAL-CONTAINING CHA ZEOLITES

(71) Applicants: Lifeng Wang, Bryn Mawr, PA (US); Bjorn Moden, West Chester, PA (US); James Thomas Hughes, Devon, PA (US); Hong-Xin Li, Lansdale, PA (US)

(72) Inventors: Lifeng Wang, Bryn Mawr, PA (US); Bjorn Moden, West Chester, PA (US); James Thomas Hughes, Devon, PA (US); Hong-Xin Li, Lansdale, PA (US)

(73) Assignee: Ecovyst, Inc, Malvern, PA (US)

( * ) Notice: Subject to any disclaimer, the term of this patent is extended or adjusted under 35 U.S.C. 154(b) by 103 days.

(21) Appl. No.: 16/723,145

(22) Filed: Dec. 20, 2019

(65) Prior Publication Data

US 2020/0197916 A1    Jun. 25, 2020

Related U.S. Application Data

(60) Provisional application No. 62/782,556, filed on Dec. 20, 2018.

(51) Int. Cl.
*B01J 29/76* (2006.01)
*B01D 53/94* (2006.01)
(Continued)

(52) U.S. Cl.
CPC ........ *B01J 29/763* (2013.01); *B01D 53/9418* (2013.01); *B01J 37/0018* (2013.01);
(Continued)

(58) Field of Classification Search
None
See application file for complete search history.

(56) References Cited

U.S. PATENT DOCUMENTS

| 5,114,563 A | * | 5/1992 | Lok | B01J 20/18 208/111.01 |
| 2011/0076229 A1 | * | 3/2011 | Trukhan | B01J 29/072 423/703 |

(Continued)

FOREIGN PATENT DOCUMENTS

| EP | 3293149 | 3/2018 |
| WO | WO 2009/141324 A1 | 6/2014 |
| WO | WO 2014/090698 A1 | 6/2014 |

OTHER PUBLICATIONS

Ren, Limin et al. "Designed copper-amine complex . . . ". Chem. Commun. 47, 9789-9791. (2011) (Year: 2011).*
International Search Report for PCT/US2019/067886.

*Primary Examiner* — Sheng H Davis
(74) *Attorney, Agent, or Firm* — Finnegan, Henderson, Farabow, Garrett & Dunner, LLP

(57) ABSTRACT

A metal-containing chabazite zeolite, which has an FTIR peak area ratio between the peak at 900-1300 cm$^{-1}$ (Si—O—Si asymmetric stretch) and the peak at 765-845 cm$^{-1}$ (~805 cm$^{-1}$ is Si—O—Si symmetric stretch) of at least 55. A method for preparing metal-containing CHA zeolites with high SCR activity at low reaction temperatures from alkali cation-free reaction mixtures that contain the three OSDA structures: metal-polyamine, N,N,N-trimethyl-1-adamantyl ammonium (TMAda+) and TMAOH. The metal-containing CHA zeolites produced by the disclosed method can be identified by XRD, FTIR spectroscopy, FT-VIS spectroscopy, and scanning electron microscopy. A method of selective catalytic reduction of NOx in exhaust gas using the material described herein is also disclosed.

19 Claims, 13 Drawing Sheets

(51) Int. Cl.
  *B01J 37/00*    (2006.01)
  *B01J 37/03*    (2006.01)
  *B01J 37/04*    (2006.01)
  *B01J 37/08*    (2006.01)
  *C01B 39/48*    (2006.01)
  *G01N 30/74*    (2006.01)

(52) U.S. Cl.
  CPC .............. *B01J 37/036* (2013.01); *B01J 37/04* (2013.01); *B01J 37/08* (2013.01); *C01B 39/48* (2013.01); *B01D 2255/20738* (2013.01); *B01D 2255/20761* (2013.01); *B01D 2255/50* (2013.01); *C01P 2002/72* (2013.01); *C01P 2002/82* (2013.01); *C01P 2002/84* (2013.01); *C01P 2004/03* (2013.01); *G01N 2030/743* (2013.01)

(56) References Cited

U.S. PATENT DOCUMENTS

2012/0020875 A1* 1/2012 Matsuo ................ B01J 37/0045
                                                                423/700
2015/0151286 A1* 6/2015 Rivas-Cardona ...... B01J 29/763
                                                                423/703

* cited by examiner

DIRECT SYNTHESIS OF METAL-CONTAINING CHA ZEOLITES

TECHNICAL FIELD

The present disclosure relates generally to a direct synthesis method of producing metal-containing chabazite (CHA) zeolites, metal-containing chabazite (CHA) zeolites made using the disclosed methods, and methods of selective catalytic reduction using the disclosed zeolites.

BACKGROUND

Metal-containing aluminosilicate CHA-type zeolites, such as Cu containing CHA zeolites, are important catalysts used in commercial selective catalytic reduction (SCR) systems for NOx abatement in automotive applications. Due to the stringent emission regulations, commercial Cu containing CHA zeolites are required to display high SCR activity especially at low exhaust temperatures.

Commercial Cu containing CHA catalysts are typically produced from the following steps. First, CHA-type zeolites are produced from reaction mixtures that contain alkali cations. Second, the alkali containing zeolites are ion-exchanged (e.g. ammonium exchange) to remove the alkali cations from the zeolite. Third, the ammonium containing zeolites are exchanged with Cu ions to obtain the Cu containing zeolites. However, the additional ammonium and Cu exchange steps to achieve Cu containing CHA caused increased synthesis cost and lowered efficiency. As a result, there is a need for direct synthesis methods for synthesizing highly active Cu containing CHA zeolites that do not require ammonium exchange and Cu exchange.

Prior to this invention, other reported direct synthesis methods for Cu containing CHA zeolites produce catalysts with a variety of problems. For example, the catalysts typically did not exhibit high SCR activity characteristics that are required for commercial applications or had limitations to the processing techniques. For example, such synthesis methods often require large amounts of expensive organic structure-directing agents (OSDAs) that increase costs or require the use of alkali in the synthesis which need extra ion exchange steps to remove.

The direct synthesis method of making a Cu containing microporous crystalline material is directed to overcoming one or more of the problems set forth above and/or other problems of the prior art.

SUMMARY

In one aspect, the present disclosure is directed to a metal-containing chabazite zeolite, which has an FTIR peak area ratio between the peak at 900-1300 $cm^{-1}$ and the peak at 765-845 $cm^{-1}$ of at least 55.

In another aspect, the present disclosure is directed to a method of selective catalytic reduction (SCR) of NOx in exhaust gas. The method comprises contacting exhaust gas, such as in the presence of ammonia or urea, with a zeolitic material comprising a copper containing CHA-type zeolite, which has an FTIR peak area ratio between the peak at 900-1300 $cm^{-1}$ and the peak at 765-845 $cm^{-1}$ of at least 55.

Another aspect disclosed herein is a direct synthesis method of making a Cu containing microporous crystalline material from reaction mixtures that (1) are essentially void of alkali metal cations and (2) contain Cu-polyamine complex (e.g. Cu-TEPA) as the first OSDA and Copper source and (3) contain N,N,N-trimethyl-1-adamantyl ammonium (TMAda+) or trimethylbenzylammonium (TMBA+) or N,N,N-dimethylethylcyclohexyl ammonium (DMECHA+) organic as the second OSDA and (4) contain tetramethyl ammonium (TMA+) or tetraethyl ammonium (TEA+) organic as the third OSDA.

In an embodiment, there is described a method of making a microporous crystalline material from reaction mixtures that are essentially void of alkali metal cations, and that comprise organic structure directing agents (OSDA) selected from (1) metal-polyamine as the first OSDA, (2) N,N,N-trimethyl-1-adamantyl ammonium (TMAda+), or trimethylbenzylammonium (TMBA+) or N,N,N-dimethylethylcyclohexylammonium (DMECHA+) organic or mixtures thereof as the second OSDA, and (3) TMA+ or TEA+ or mixtures thereof as the third OSDA. In this embodiment, the method comprises: a) mixing sources of alumina, silica, water, a first OSDA, a second OSDA and optionally a third OSDA and optionally a seed material to form a gel; b) heating the gel in a vessel at a temperature ranging from 80° C. to 250° C. to form a crystalline chabazite product; and c) calcining the product to produce an aluminosilicate zeolite having a CHA structure, and a silica-to-alumina ratio (SAR) ranging from 5 to 60.

BRIEF DESCRIPTION OF THE DRAWINGS

The accompanying figures are incorporated in and constitute a part of this specification.

Figure 1A:
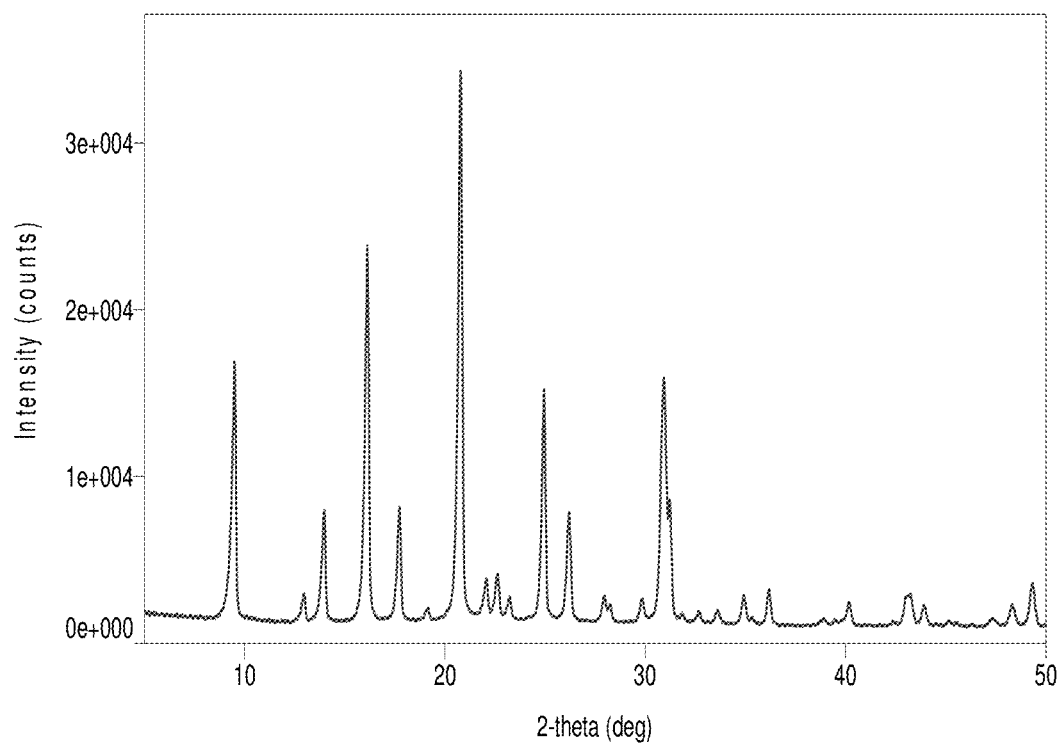
FIG. 1A is an x-ray diffraction pattern and FIG. 1B is a deconvolution of peaks between 30-32° for a sample made in accordance to Example 1.

Aside from the subject matter discussed above, the present disclosure includes a number of other features such as those explained hereinafter. Both the foregoing description and the following description are exemplary only.

DETAILED DESCRIPTION OF THE INVENTION

As used herein "essentially void of alkali metal cations," means having trace amounts of alkali metal cations. In an embodiment, "essentially void" or "trace amounts" means 0.3 wt % alkali oxides, such as Na$_2$O or K$_2$O, or less.

As indicated, the disclosed zeolite comprises a metal-containing chabazite zeolite, such as a copper or iron containing zeolite, which has an FTIR peak area ratio between the peak at 900-1300 cm$^{-1}$ and the peak at 765-845 cm$^{-1}$ of at least 55. In an embodiment, the chabazite zeolite has a silica-to-alumina ratio (SAR) ranging from 5 to 60, such as from 10 to 50, or even from 10 to 30.

When the described zeolite comprises copper, it is present in an amount of at least 0.5 weight percent of the total weight of the material, such as an amount ranging from 0.5 to 10 weight percent of the total weight of the material.

When the described zeolite comprises iron, it is present in an amount of at least 0.5 weight percent of the total weight of the material, such as an amount ranging from 0.5 to 10 weight percent of the total weight of the material.

In an embodiment, the total alkali oxide amount is present in an amount less than 0.3 weight percent, such as less than 0.1 weight percent.

In an embodiment, the disclosed zeolite has a peak area ratio between the FT-VIS peak ranging from 500-1100 nm and the FT-VIS peak of Cu(OH)$_2$ between 500-1100 nm of lower than 2.5.

The disclosed method of making a microporous crystalline material and the resulting Cu containing zeolite material having a CHA-type framework structure are directed to overcoming one or more of the problems set forth above and/or other problems of the prior art. Unlike the prior art, for example, there is described a method for preparing Cu containing CHA zeolites with high selective catalytic reduction ("SCR") activity at low reaction temperatures from alkali cation-free reaction mixtures that contain the following OSDA structures: Cu-polyamine complex (e.g. Cu-TEPA) as the first OSDA and Cu source; N,N,N-trimethyl-1-adamantyl ammonium (TMAda+) or trimethylbenzylammonium (TMBA+) or N,N,N-dimethylethylcyclohexylammonium (DMECHA+) organic as the second OSDA; tetramethyl ammonium hydroxide (TMAOH) or tetraethyl ammonium hydroxide (TEAOH) as an optional third OSDA.

Cu-polyamine complex serves as both the OSDA and Cu source. In one embodiment, polyamine may be selected from Diethylenetriamine, triethylenetetramine, tetraethylenepentamine, pentaethylenehexamine, N-(2-hydroxyethyl) ethylenediamine, N,N-bis(2-aminoethyl)-1,3-propanediamine, 1,2-bis(3-aminopropylamino), 1,4,8,11-tetraazacyclotetradecane, 1,4,8,11-tetramethyl-1,4,8,11-tetraazacyclotetradecane, and combinations thereof, amongst others. In an embodiment, the polyamine is tetraethylenepentamine.

In an embodiment, the method of making a microporous crystalline material from reaction mixtures that (1) are essentially void of alkali metal cations and (2) contain Cu-TEPA as the first OSDA and (3) N,N,N-trimethyl-1-adamantyl ammonium (TMAda+) as the second OSDA and (4) TMA+ or TEA+ as the third OSDA.

In an embodiment, the method comprises:

a) mixing sources of alumina, silica, water, Cu-TEPA, TMAdaOH, TMAOH (or TEAOH) and optionally a seed material to form a gel;

b) heating the gel in a vessel at a temperature ranging from 80° C. to 250° C. to form a crystalline chabazite product; and c) calcining the product to produce an aluminosilicate zeolite having a CHA structure, and a silica-to-alumina ratio (SAR) ranging from 5 to 60, such as from 10 to 50, or even from 10 to 30.

In an embodiment, the gel may have a water to silica (H$_2$O/SiO$_2$) molar ratio of 1-50. The gel may also have a TMAdaOH to silica (TMAdaOH/SiO$_2$) molar ratio ranging from 0.01-0.5. In one embodiment, the as synthesized material following step b) exhibits an XRD peak area ratio between the [3,1,0] peak and the peak doublet (sum of [3,-1,-1] peak and [3,1,0] peak) of at least 0.15.

In one embodiment, the reaction mixtures with (A) molar composition 1 SiO$_2$:m Al$_2$O$_3$:n Cu-TEPA:x TMAdaOH:y TMAOH:z H$_2$O, where m=0.016-0.2, n=0.01-0.12, x=0.01-0.50, y=0.01-0.50, z=1-50 and (B) trace concentrations of alkali cations.

In one embodiment, the disclosed method may further comprise adding to the microporous crystalline material at least one metal chosen from copper, iron or combinations thereof, to form a metal containing chabazite.

When the metal added to the microporous crystalline material comprises copper, the copper comprises at least 0.5 weight percent of the total weight of the material, such as an amount ranging from 0.5 to 10 weight percent of the total weight of the material.

When the metal added to the microporous crystalline material comprises iron, the iron comprises at least 0.5 weight percent of the total weight of the material, such as an amount ranging from 0.5 to 10 weight percent of the total weight of the material.

Non-limiting examples of sources of alumina that may be used in the present disclosure include aluminum hydroxide, such as aluminum trihydroxide, alumina, alumina hydrates, aluminum alkoxides, aluminum nitrate, aluminum sulfate and aluminum acetate.

Non-limiting examples of sources of silica that may be used in the present disclosure include colloidal silica, silica gel, precipitated silica, silica-alumina, fumed silica, silicon alkoxides, and the like.

Non-limiting examples of sources of copper that may be used in the present disclosure include copper salts such as cupric acetate, cupric nitrate, cupric sulfate, cupric hydroxide, cupric oxide and cupric chloride.

Non-limiting sources of iron that may be used in the present disclosure include an iron salt such as ferric nitrate, ferric chloride, ferrous chloride, and ferrous sulfate.

The suitable metals used for forming metal-polyamine complexes are not limited to Cu and Fe, which are usually used for SCR applications. Optionally the transition metal centers can also be Mn, Co, Ni, Pd, Pt and Zn.

The molar polyamine/metal ratio that may be used in the present disclosure is 0.2-5, such as 1-2.

In one embodiment, there is disclosed a copper containing chabazite zeolite synthesized according to methods described herein. In one embodiment, the disclosed copper containing chabazite zeolite in the as-synthesized form exhibits an XRD peak area ratio between the higher-degree [3,1,0] shoulder peak of the XRD peak doublet at 30-32° 2 theta and the whole peak doublet ([3,1,0] and main [3,−1,−1] peak) is at least 0.15.

In an embodiment, the disclosed Cu containing zeolite material has an absorbance of the FTIR peak centered at 1030-1080 $cm^{-1}$ of at least 0.3 absorbance units. In an embodiment, the disclosed Cu containing zeolite material having a CHA-type framework structure, has an intense peak near 1050-1070 $cm^{-1}$ FTIR spectrum, which is much weaker in the products from the prior art. In an embodiment, the peak area ratio of the peak at 900-1300 $cm^{-1}$ to the peak at 765-845 $cm^{-1}$ (805 $cm^{-1}$ is Si—O—Si symmetric stretch) is at least 55 for the disclosed zeolite material, such as at least 60.

In an embodiment, the disclosed Cu containing zeolite material having a CHA-type framework structure, has a peak area in the 500-1100 nm range of the FT-VIS spectrum much lower than that in the products from the prior art. In an embodiment, the ratio of the peak area of Inventive examples relative to the reference $Cu(OH)_2$ peak area is below 2.5, such as below 2.2.

The Cu containing CHA zeolites produced by the disclosed method can be uniquely identified by methods that characterize detailed structure and morphology of zeolites. The inventors have shown that X-ray diffraction (XRD), FTIR spectroscopy, FT-VIS spectroscopy, and scanning electron microscopy (SEM) can be used to easily differentiate the Cu CHA zeolites prepared from these disclosed methods from CHA zeolites produced from prior synthetic methods.

In an embodiment, there is disclosed a Cu containing zeolite material having a CHA-type framework structure, having a crystal morphology, including crystal size, which is different from the products from prior art. The zeolite crystals prepared using the disclosed methods have a size ranging from 0.1-10 microns. In an embodiment, each crystal contains nanocrystals. The crystal surfaces of the comparative samples 1 and 3 are smooth with some nanoparticles partially deposited on their surfaces. The crystals of comparative sample 2 are very large (about 5 microns) and contain many layers of small crystals.

In an embodiment, there is disclosed a method of selective catalytic reduction (SCR) of NOx in exhaust gas using the material described herein. For example, in an embodiment, the method comprises contacting exhaust gas with a zeolitic material comprising a copper containing CHA-type zeolites, which show higher SCR activities at low reaction temperatures (150° C., 175° C., 200° C.) than the products from prior art.

In another embodiment, the method comprises contacting exhaust gas with a zeolitic material comprising a copper containing CHA-type zeolites, which show higher SCR activities at low reaction temperatures (150° C., 175° C., 200° C.) than the products from prior art upon the hydrothermal treatment at 750° C. with 10% moisture for 16 hrs.

In an embodiment, the contacting step for the method of selective catalytic reduction (SCR) of NOx in exhaust gas is performed in the presence of ammonia or urea.

EXAMPLES

The following non-limiting examples, which are intended to be exemplary, further clarify the present disclosure.

Example 1—Direct Synthesis of Cu-CHA

Pseudo-boehmite alumina was dissolved into a mixture of Cu-TEPA, TMAdaOH, and TMAOH solution for about 60 minutes followed by slow addition of silica sol (40% $SiO_2$, Ludox AS-40). The gel was stirred for 60 minutes and seed material was added (1 wt. % of total mass of silica+alumina) before loading into an autoclave (Parr Instruments). The molar composition of the gel was 1.0 $SiO_2$/0.042 $Al_2O_3$/0.028 Cu-TEPA/0.062 TMAdaOH/0.062 TMAOH/12.5 $H_2O$.

The autoclave was heated to 160° C. and maintained at the temperature for 96 hours while stirring at 150 RPM. After cooling, the product was recovered by filtration, washed with deionized water, and dried in a 110° C. convection oven. The as-synthesized product was examined by XRD, and it was found a Cu containing zeolite having chabazite framework had been obtained (FIG. 1). The product was calcined in air at 600° C. for 5 hrs to remove the residual organic. The occluded organic in the dried as-synthesized zeolite was removed by calcination in air at 600° C. for 5 hours. The product had a $SiO_2/Al_2O_3$ ratio (SAR) of 22.2 and contained 3.7 wt. % CuO (Table 1).

Example 2—Direct Synthesis of Cu-CHA

Sample 2 was prepared using the same protocol as described in Example 1 except the molar composition of the final mixture was adjusted to prepare a CHA zeolite with a different SAR. The composition of the final reaction mixture was 1.0 $SiO_2$/0.049 $Al_2O_3$/0.032 Cu-TEPA/0.062 TMAdaOH/0.062 TMAOH/12.3 $H_2O$.

Figure 2A:
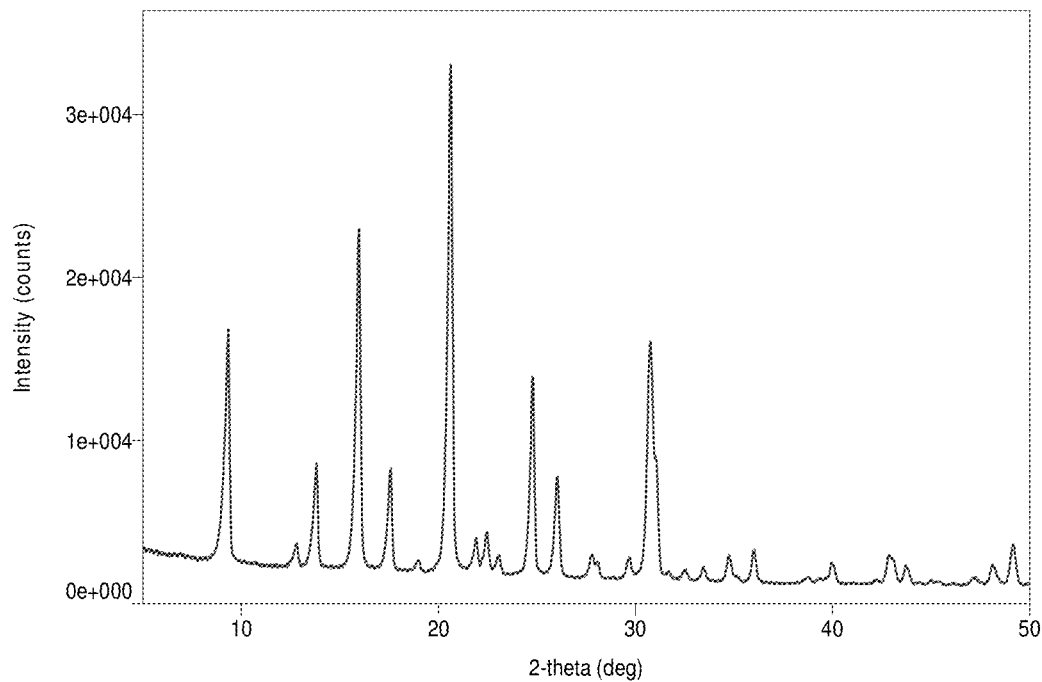
FIG. 2A is an x-ray diffraction pattern and FIG. 2B is a deconvolution of peaks between 30-32° for a sample made in accordance to Example 2.
Figure 2B:
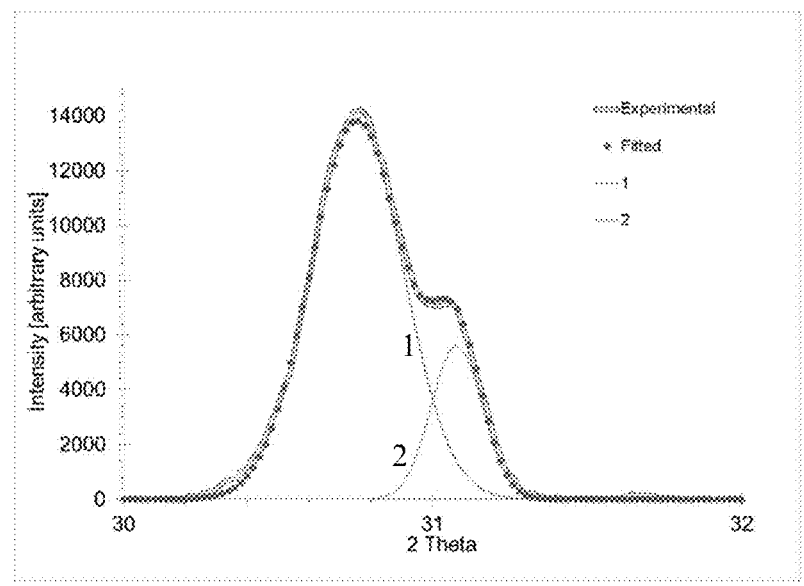

The autoclave was heated to 140° C. and maintained at the temperature for 144 hours while stirring at 150 RPM. After cooling, the product was recovered by filtration, washed with deionized water, and dried in a 110° C. convection oven. The as-synthesized product was examined by XRD, and it was found a Cu containing zeolite having chabazite framework had been obtained (FIG. 2). The product was calcined in air at 600° C. for 5 hrs to remove the residual organic. The occluded organic in the dried as-synthesized zeolite was removed by calcination in air at 600° C. for 5 hours. The product had a $SiO_2/Al_2O_3$ ratio (SAR) of 21.4 and contained 4.3 wt. % CuO (Table 1).

Example 3—Direct Synthesis of Cu-CHA

Sample 3 was prepared using the same protocol as described in Example 1 except the molar composition of the final mixture was adjusted to prepare a CHA zeolite with a different SAR. The composition of the final reaction mixture was 1.0 $SiO_2$/0.061 $Al_2O_3$/0.033 Cu-TEPA/0.067 TMAdaOH/0.080TMAOH/12.9 $H_2O$.

Figure 3A:
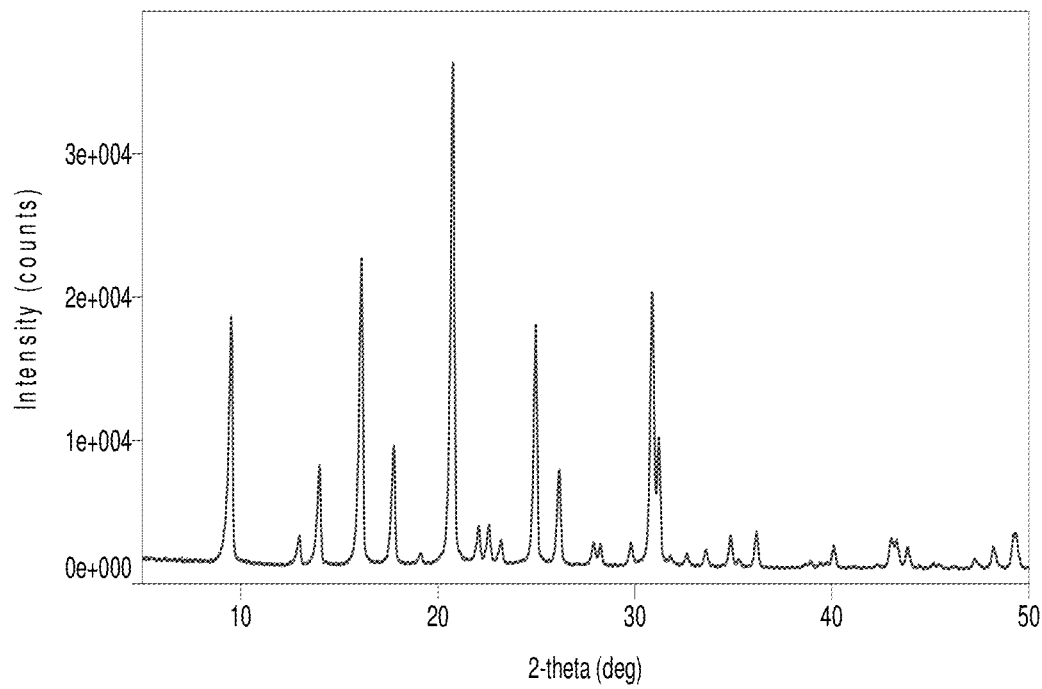
FIG. 3A is an x-ray diffraction pattern and FIG. 3B is a deconvolution of peaks between 30-32° for a sample made in accordance to Example 3.
Figure 3B:
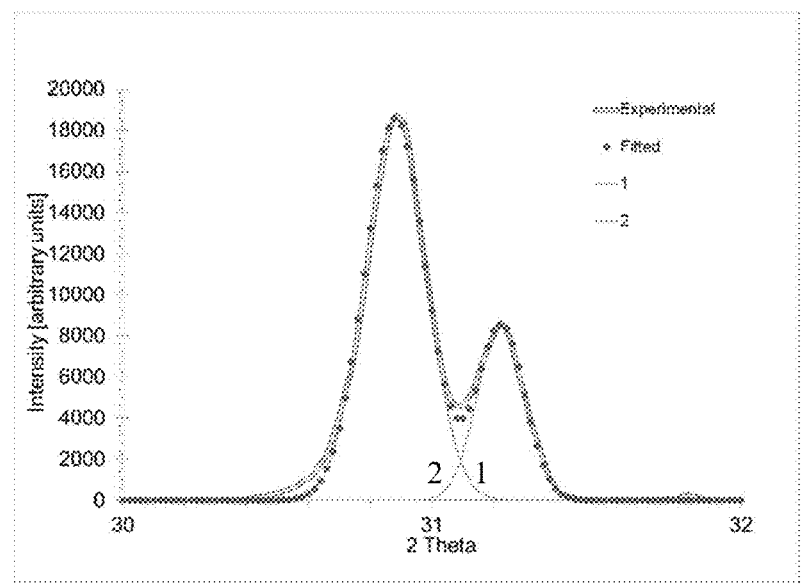

The autoclave was heated to 160° C. and maintained at the temperature for 96 hours while stirring at 150 RPM. The product was examined by XRD, and it was found a Cu containing zeolite having chabazite framework had been obtained. The product showed the X-ray diffraction pattern of chabazite (FIGS. 3A and B). The product had a $SiO_2/Al_2O_3$ ratio (SAR) of 16.6 and contained 4.1 wt. % CuO (Table 1).

Example 4—Direct Synthesis of Cu-CHA

Sample 4 was prepared using the same protocol as described in Example 1. The composition of the final reaction mixture was 1.0 $SiO_2$/0.042 $Al_2O_3$/0.028 Cu-TEPA/ 0.062 TMAdaOH/0.062TMAOH/12.5 $H_2O$.

Figure 3C:
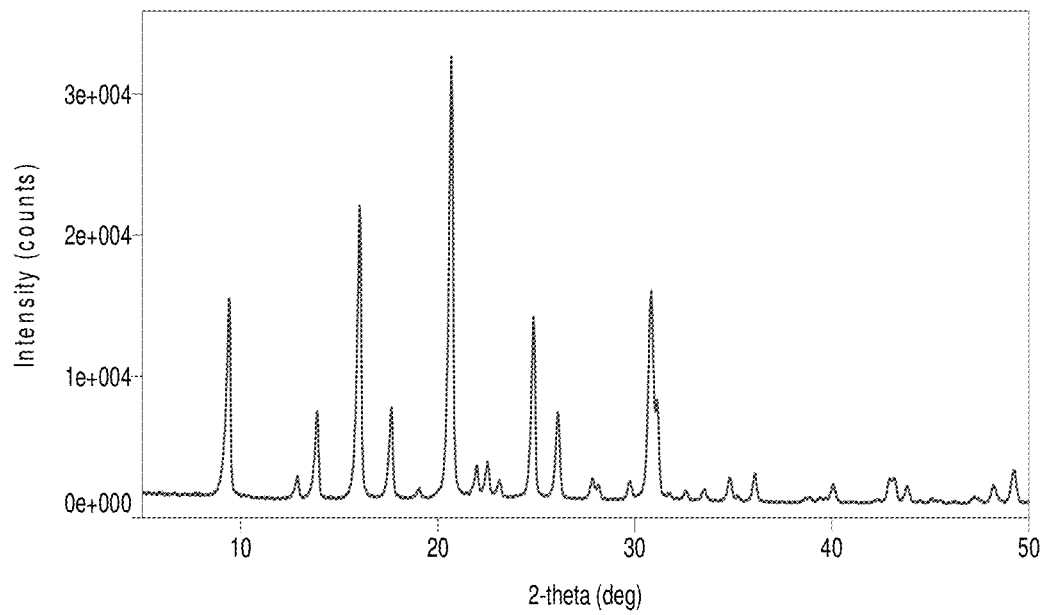
FIG. 3C is an x-ray diffraction pattern and FIG. 3D is a deconvolution of peaks between 30-32° for a sample made in accordance to Example 4
Figure 3D:
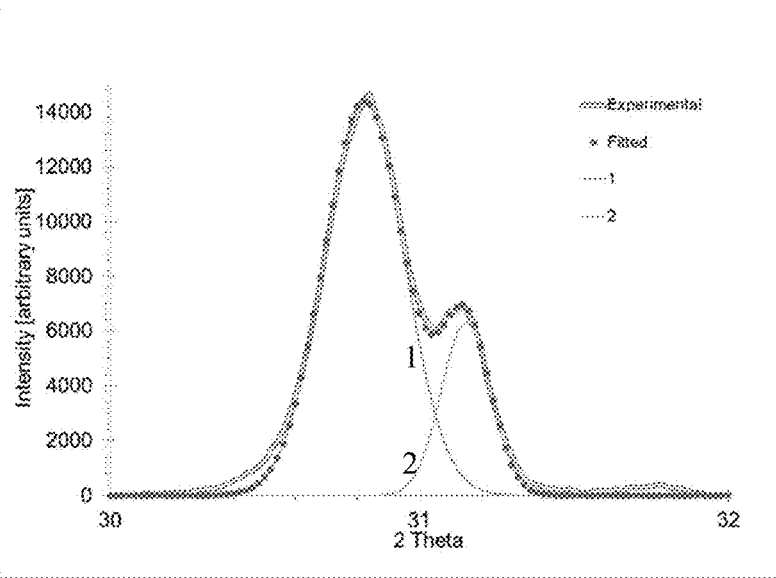

The autoclave was heated at 140° C. for 48 hours followed by 180° C. for 24 hours while stirring at 150 RPM. The product was examined by XRD, and it was found a Cu containing zeolite having chabazite framework had been obtained. The product showed the X-ray diffraction pattern of chabazite (FIGS. 3C and D). The product had a $SiO_2$/$Al_2O_3$ ratio (SAR) of 23.6 and contained 3.6 wt. % CuO (Table 1).

Comparative Example 1

The method disclosed by Trukhan et al. in U.S. Pat. No. 8,715,618 B2 (U.S. Pat. No. 9,272,272 B2) describes direct synthesis of Cu containing CHA prepared using a mixture of N,N,N-trimethyl-1-adamantyl ammonium (TMAdaOH) with trimethylbenzylammonium hydroxide (TMBA) or tetramethyl ammonium hydroxide (TMAOH) as the combined OSDAs, and Cu Nitrate or $Cu(NH_3)_4CO_3$ as the Cu source. Example 10 from U.S. Pat. No. 8,715,618 B2 is an example of the preparation of CHA zeolites from a gel that contains OSDAs TMAdaOH and TMAOH and Cu source $Cu(NH_3)_4CO_3$.

In this Example, the method was reproduced for comparison to the current disclosed methods. Aluminum triisopropylate, TMAdaOH, TMAOH, $Cu(NH_3)_4CO_3$, Ludox AS-40, deionized water and CHA seeds were mixed to form the reported gel composition of 36 $SiO_2$/2.7Al isoprop./2.6TMAdaOH/3.0TMAOH/1.02Cu amine/448$H_2O$, which was identical to the reported gel composition of 36$SiO_2$/2.7Al isoprop./2.6TMAdaOH/3.0TMAOH/0.96Cu amine/448$H_2O$.

Figure 4A:
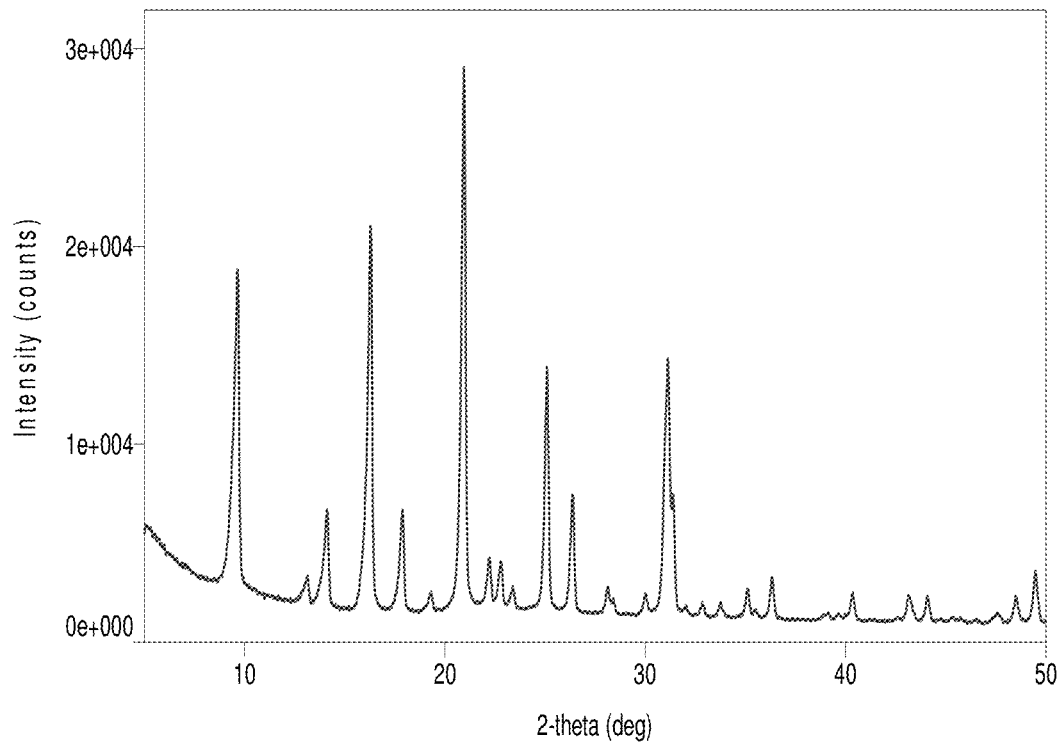
FIG. 4A is an x-ray diffraction pattern and FIG. 4B is a deconvolution of peaks between 30-32° for a sample made in accordance to Comparative Example 1.
Figure 4B:
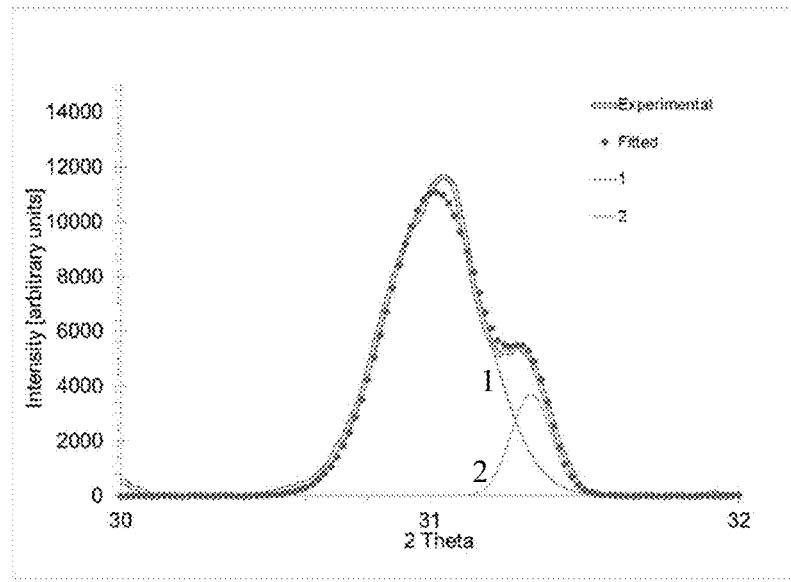
Figures 10A, 10B:
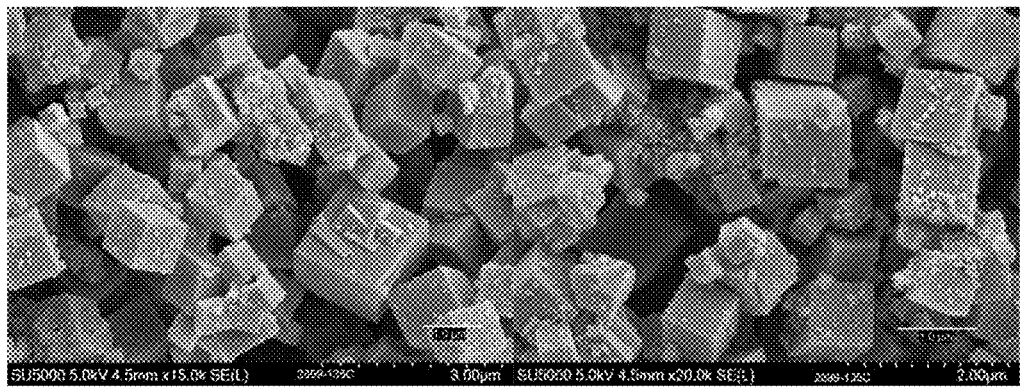
FIG. 10A and FIG. 10B are scanning electron microscope (SEM) images at various magnifications of Comparative Example 1.

The gel was loaded into an autoclave (Parr Instruments) and heated to 160° C. and maintained at the temperature for 48 hours while stirring at 200 RPM. The product was recovered, dried, and calcined in air at 600° C. for 5 hrs. The product showed the XRD pattern of chabazite (FIG. 4). The CuO content and SAR of the material (3.1 wt. % CuO and 26.0 SAR) were very similar to those reported in Example 10 of U.S. Pat. No. 8,715,618 B2 (3.0 wt. % CuO and 25.1 SAR). The SEM image (FIG. 10) also indicates a similar material to that reported in Example 10 of U.S. Pat. No. 8,715,618 B2.

The zeolites prepared using the method of Comparative Example 1 exhibit lower SCR activity than the current invention.

Comparative Example 2

The methods disclosed by Moliner Marin et al. in US 2016/0271596 A1 describes the preparation of Cu containing CHA zeolites from a gel that contains Cu-TEPA with either N,N,N-trimethyl-1-adamantyl ammonium (TMAda+) cation or benzyl trimethylammonium cation (TMBA+) with optionally one or more precursors including alkali cations and fluoride anions. All examples presented were prepared from gels that contains N,N,N-trimethyl-1-adamantyl ammonium (TMAda+) cations with the addition of either alkali cations or $NH_4F$.

Example 2 is an example of the preparation of Cu-CHA zeolites from a gel that contains Cu-TEPA and N,N,N-trimethyl-1-adamantyl ammonium (TMAdaOH) with the addition of NaOH. The comparative sample was prepared using the same protocol as described in Example 2. Copper (II) sulfate, tetraethylenepentamine (TEPA), N,N,N-trimethyl-1-adamantammonium hydroxide, sodium hydroxide, aluminum hydroxide, and Ludox AS40 were mixed together to form a gel with the following molar composition: The gel composition was $SiO_2$:0.033 $Al_2O_3$:0.049Cu(TEPA)$^{2+}$:0.19 TMaDA:0.12 NaOH:18.3 $H_2O$ which was identical to the reported gel composition of $SiO_2$:0.033 $Al_2O_3$:0.049Cu (TEPA)$^{2+}$:0.19 TMaDA:0.12 NaOH:18.3 $H_2O$.

Figure 5A:
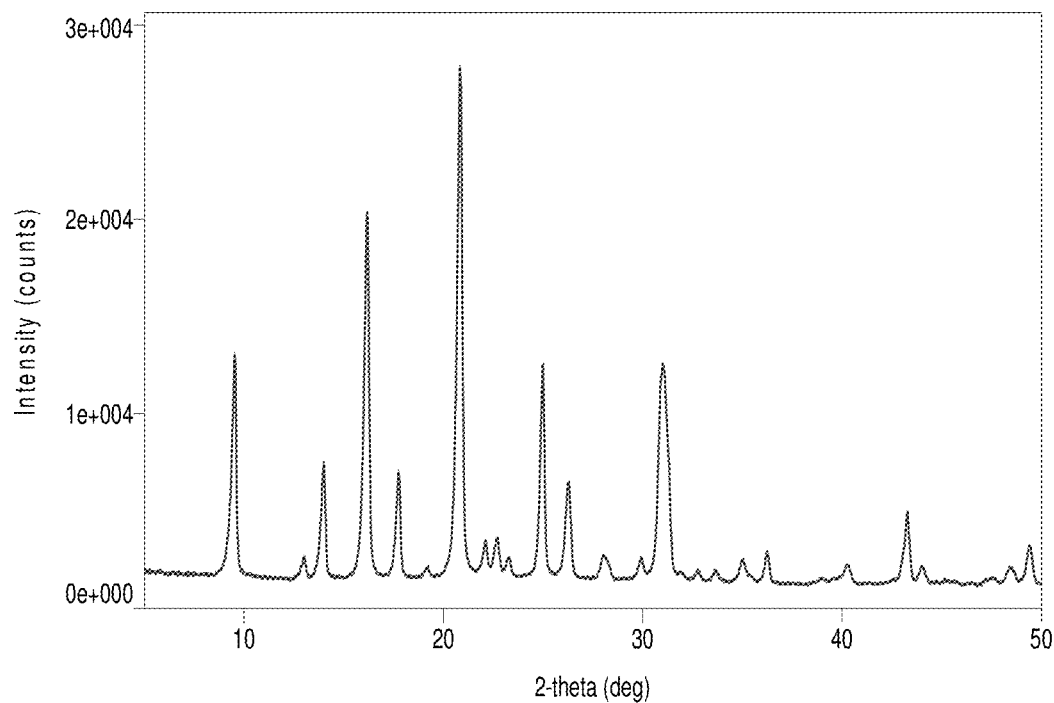
FIG. 5A is an x-ray diffraction pattern and FIG. 5B is a deconvolution of peaks between 30-32° for a sample made in accordance to Comparative Example 2.
Figure 5B:
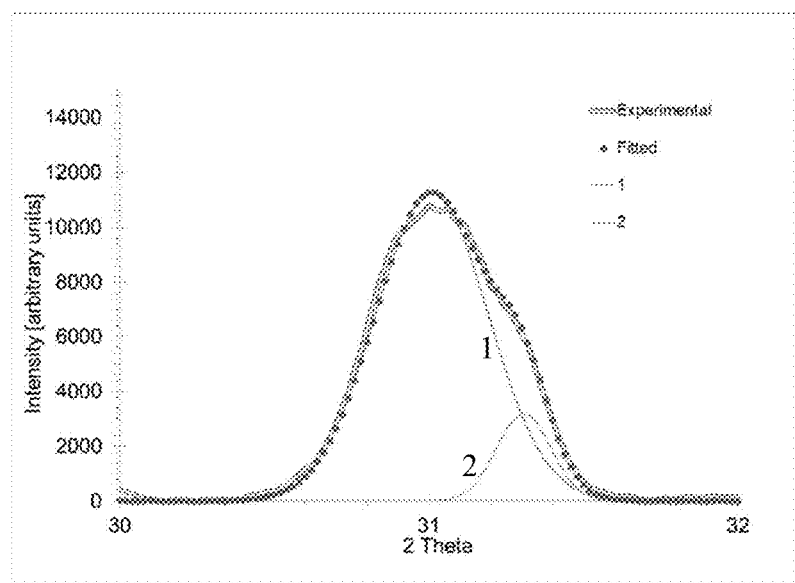

The final gel was loaded into Teflon-lined stainless steel autoclaves (Parr Instruments) and heated at 150° C. for 14 days under static conditions. After filtering, washing, and drying, the product showed the XRD pattern of chabazite (FIG. 5).

Figures 11A, 11B:
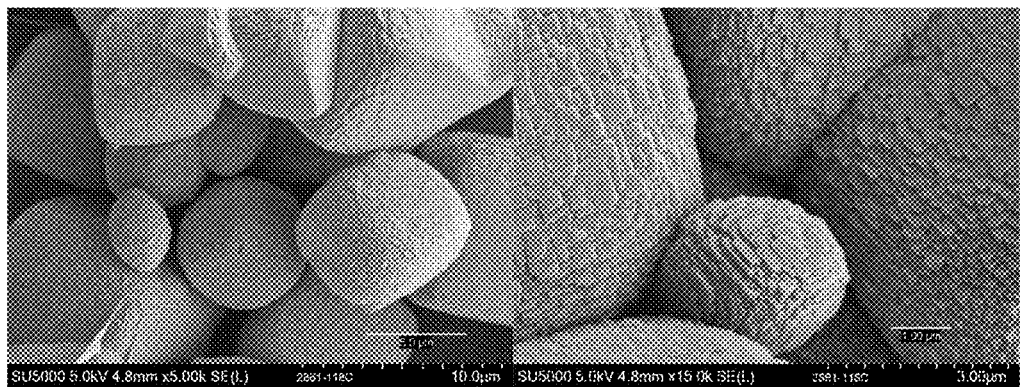
FIG. 11A and FIG. 11B are scanning electron microscope (SEM) images at various magnifications of Comparative Example 2.

The product was calcined in air at 550° C. for 6 hrs to remove the residual organic. The SAR of the material (28.9 SAR) was similar to that reported in Example 2 of US 2016/0271596 A1 (27.8 SAR). The 5.7 wt. % CuO content of the material was higher than the reported 4.0 wt. % CuO but is close to the initial 6.1 wt. % CuO content in the starting gel. The SEM image (FIG. 11) also indicates a similar material to that reported in Example 2 of US 2016/0271596 A1.

The zeolites prepared using the method of Comparative Example 2 exhibit lower SCR activity than the current invention.

Comparative Example 3

The methods disclosed by Rivas-Cardona et al. in US 2015/0151286 A1 and US 2015/0151287 A1 describes the preparation of Cu containing CHA zeolites from a gel that contains Cu-TEPA with a second OSDA TMAda (US 2015/0151286 A1) or DMECHA (US 2015/0151287 A1) with optionally NaOH.

A comparative sample was prepared using the same protocol for the synthesis of JMZ-4 as described in both [0032] and Example 1 presented in 2015/0151286 A1. Since there is no specific gel composition available provided in the patent, we used a gel with molar composition $SiO_2$: 0.04$Al_2O_3$:0.30 TMAda:0.03 Cu-TEPA:18 $H_2O$ falling in the claimed composition range. Aluminum source Al(OEt)$_3$ was combined with TMAda in water and mixed for 30 minutes. Next, copper sulfate and TEPA were added to the solution and the mixture was stirred for another 30 minutes. Finally, TEOS was added to the solution and mixed for 60 minutes.

Figure 6A:
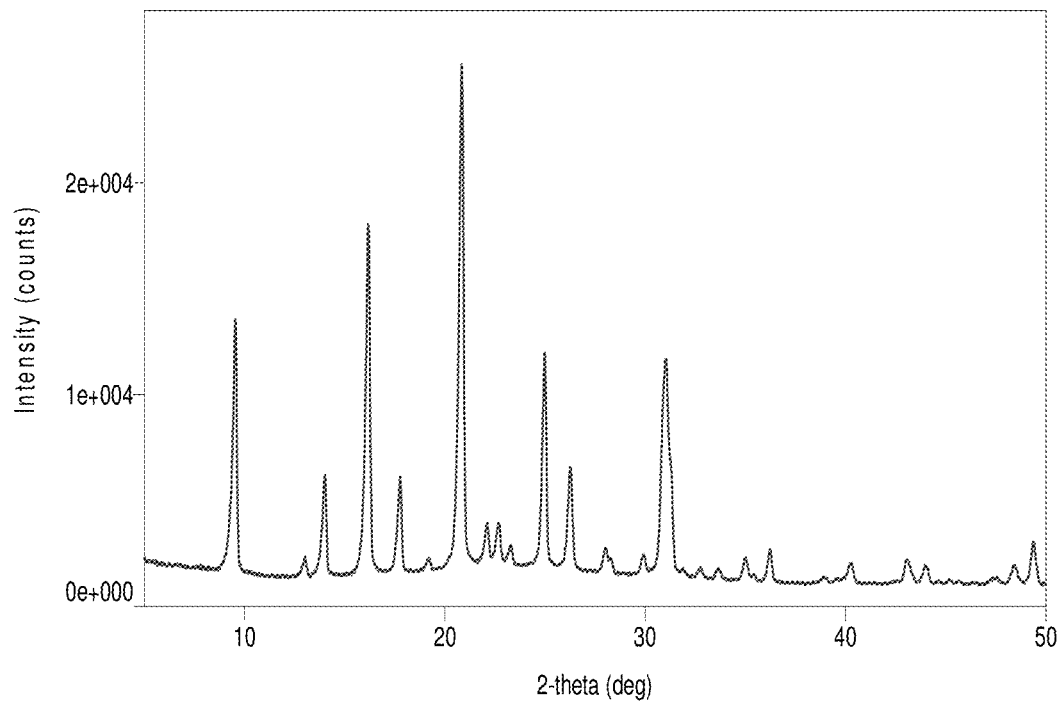
FIG. 6A is an x-ray diffraction pattern and FIG. 6B is a deconvolution of peaks between 30-32° for a sample made in accordance to Comparative Example 3.
Figure 6B:
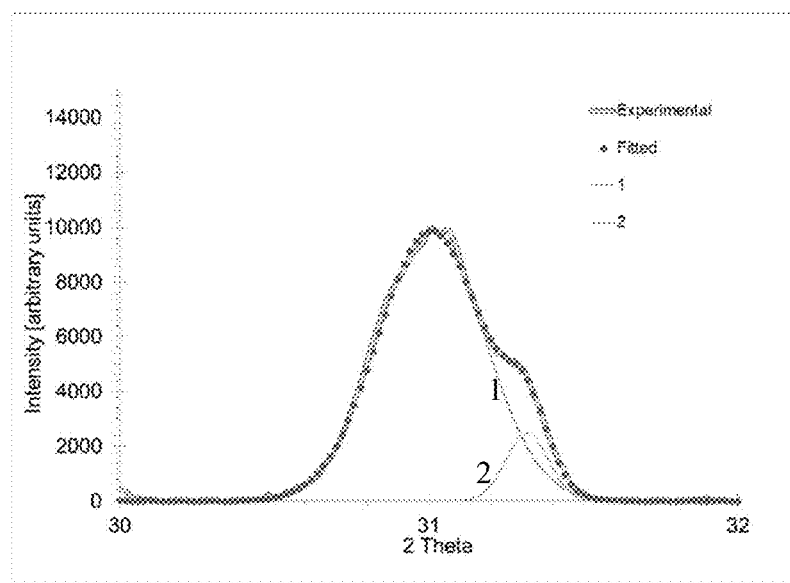

The gel was loaded into an autoclave (Parr Instruments) and heated to 160° C. for 5 days. After filtering, washing, and drying, the product showed pure phase chabazite structure by XRD (FIG. 6). The product was calcined in air at 560° C. for 8 hrs to remove the residual organic. The CuO content and SAR of the material (2.9 wt. % CuO and 21.0 SAR) fall in the 10-30 SAR range and 0.1-5 wt. % CuO range recited in US 2015/0151286 A1.

The zeolites prepared using the method of Comparative Example 3 exhibit lower SCR activity than the current invention.

EXPERIMENTAL METHODS

This section summarizes methods used to identify and differentiate Cu-CHA zeolites prepared using the disclosed synthetic method from Cu-CHA zeolites prepared using prior synthetic methods.

SCR Catalytic Tests:

The activities of the hydrothermally aged materials for NOx conversion, using NH3 as reductant, were tested with a flow-through type reactor. Powder zeolite samples were pressed and sieved to 35/70 mesh and loaded into a quartz tube reactor. The gas composition for $NH_3$—SCR was 500 ppm NO, 500 ppm $NH_3$, 5 vol % $O_2$, 0.6% $H_2O$ and balance $N_2$. The space velocity was 50,000 $h^{-1}$. The reactor temperature was ramped between 150° C. and 550° C. and NO conversion was determined with an MKS MultiGas infrared analyzer at each temperature point.

One important feature of Cu-CHA zeolites prepared using the disclosed synthetic method is that they exhibited both higher fresh and steamed SCR activity (at low temperature range 150° C., 175° C., 200° C.) than Cu-CHA zeolites prepared using prior synthetic methods (as shown in Tables 2 and 3). For example, the SCR activity at 150° C. of the fresh versions of the inventive examples is higher than 45%, such as higher than 50%. It is well known that SCR performance of zeolite materials are related to structure differences. The Cu containing CHA zeolites produced by the disclosed method can be uniquely identified by methods that measure the detailed structure of the zeolites.

As shown below, XRD, FTIR spectroscopy, and FT-VIS spectroscopy can be used to differentiate the Cu CHA zeolites prepared from these disclosed methods from CHA zeolites produced from prior synthetic methods.

Figure 1B:
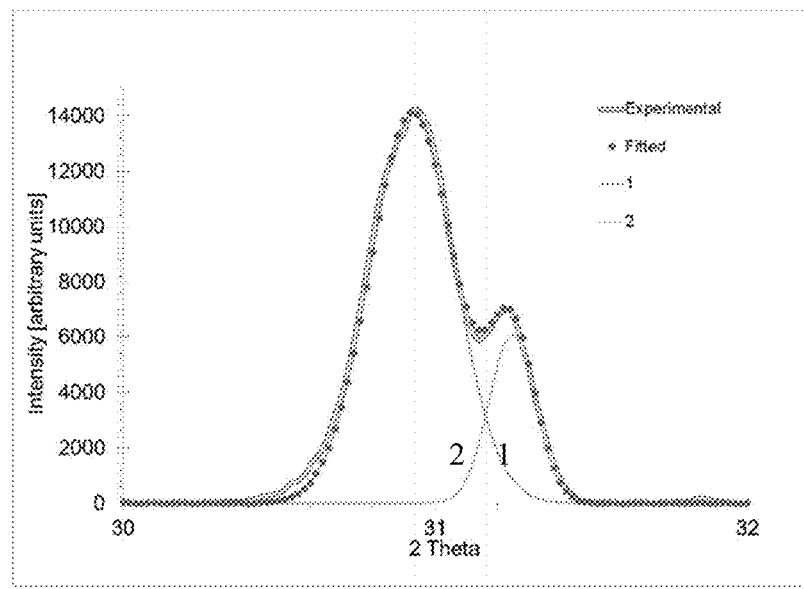

X-Ray Diffraction (XRD) Patterns:

As shown in FIGS. 1-3, XRD patterns for the as-synthesized samples prepared using the disclosed method exhibited a pronounced peak splitting between 30-32° (FIGS. 1-3), which is not present or less apparent in the products prepared from prior art (FIGS. 4-6). The peak areas of the [3,1,0] peak and the [3,-1,-1] peak were measured and the peak area ratio of [3,1,0] vs. the whole peak doublet ([3,1,0]+[3,-1,-1]) is further compared in Table 4. As an example, the [3,1,0] peak is located at about 31.2 degrees in FIG. 1B and the [3,-1,-1] peak is located at about 30.9 degrees in FIG. 1B. For the samples prepared using the disclosed method, the peak area ratios are typically high and are measured to be 0.19, 0.18, 0.26, and 0.21 for the samples in Examples 1, 2, 3, and 4, respectively. For the Comparative examples, the ratios are below 0.12 and are all substantially lower than those of the inventive samples. These data indicate that CHA zeolite samples prepared using the disclosed methods are different from the comparative examples.

Figures 7A, 7B:
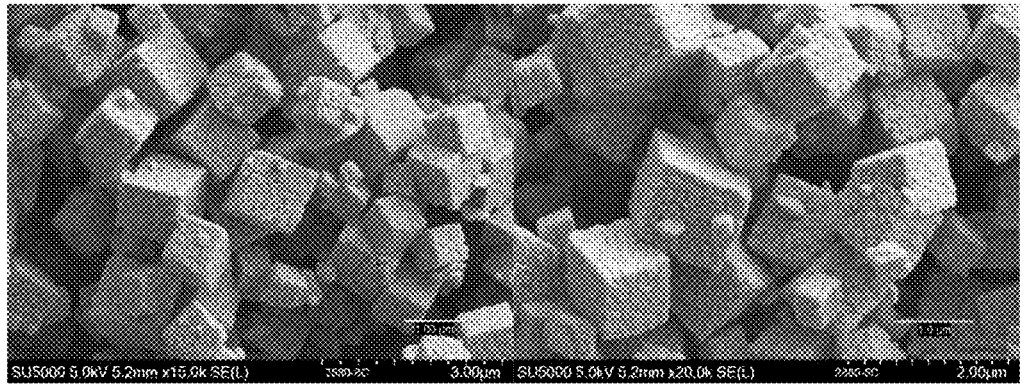
FIG. 7A and FIG. 7B are scanning electron microscope (SEM) images at various magnifications of Example 1.
Figures 8A, 8B:
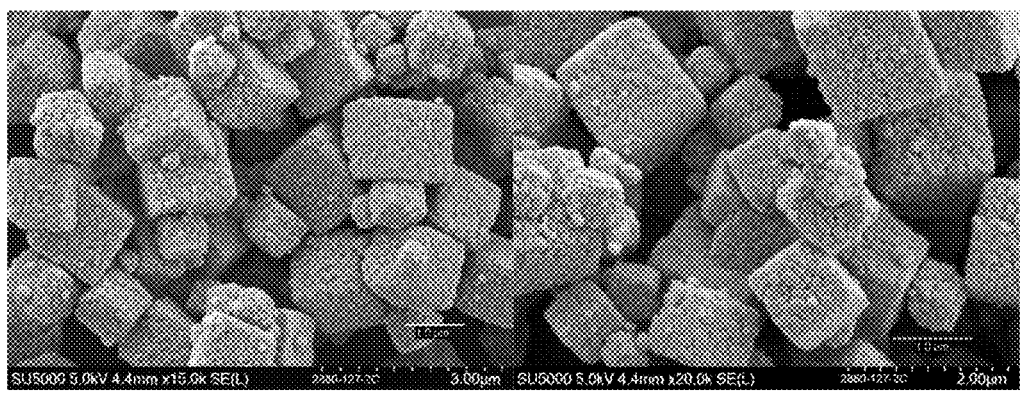
FIG. 8A and FIG. 8B are scanning electron microscope (SEM) images at various magnifications of Example 2.
Figures 9A, 9B:
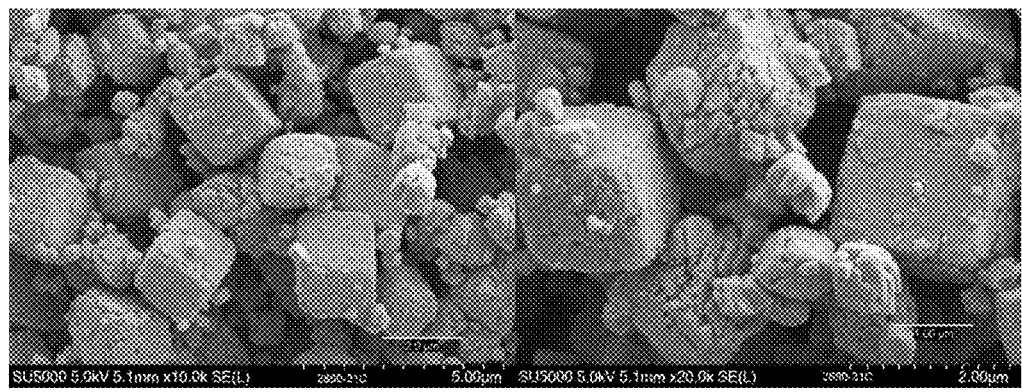
FIG. 9A and FIG. 9B are scanning electron microscope (SEM) images at various magnifications of Example 3.
Figures 9C, 9D:
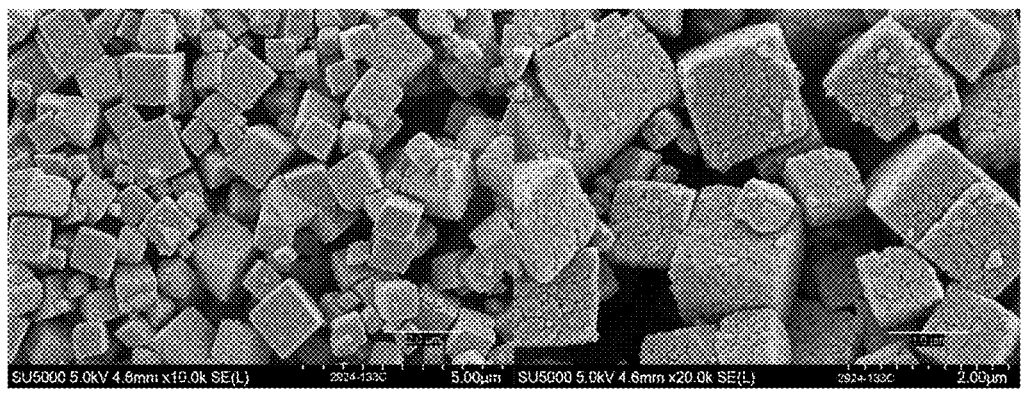
FIG. 9C and FIG. 9D are scanning electron microscope (SEM) images at various magnifications of Example 4.
Figures 12A, 12B:
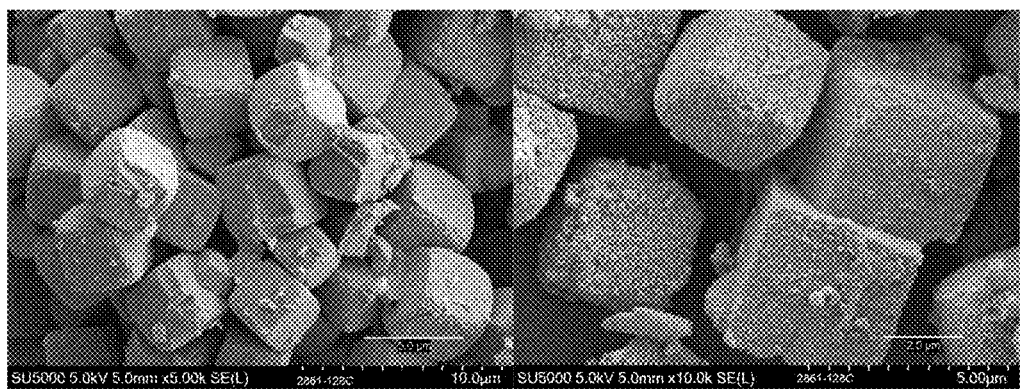
FIG. 12A and FIG. 12B are scanning electron microscope (SEM) images at various magnifications of Comparative Example 3.

Scanning Electron Microscope (SEM) Images:

SEM provides a direct method to investigate the morphology difference between different zeolite materials. For the CHA zeolite samples prepared using the disclosed methods (Examples 1, 2, 3 and 4), the SEM images show that the samples consist of cubic crystals of a size of 0.1-2 microns. The surfaces of the crystals contain small nanocrystals (FIGS. 7-9). The SEM images of the comparative examples (FIGS. 10-12) all indicate crystals different from samples prepared using the disclosed methods.

Figure 13A:
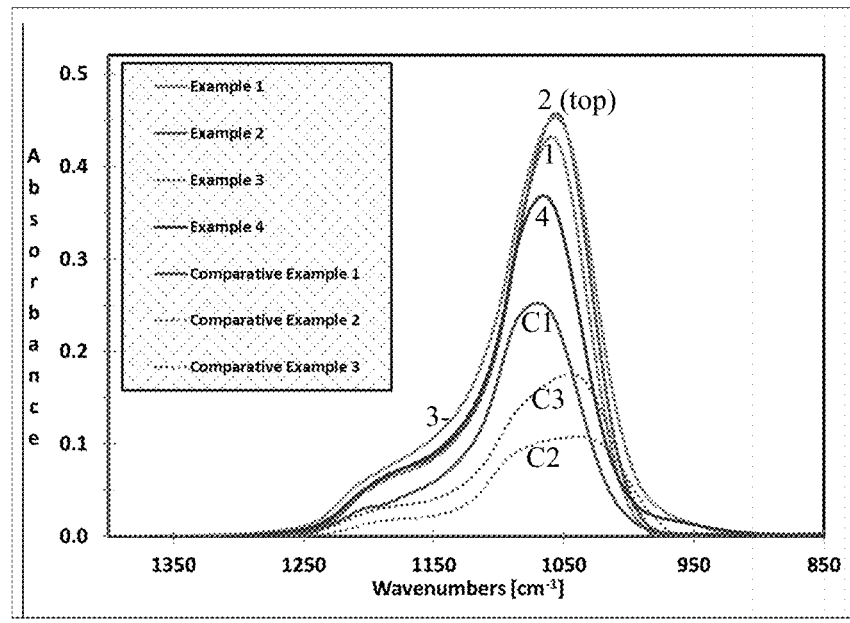
FIG. 13A shows Fourier-transform infrared spectroscopy (FTIR)/Attenuated Total Reflection (ATR) spectra of calcined Examples 1-4 and Comparative Examples 1-3.
Figure 13B:
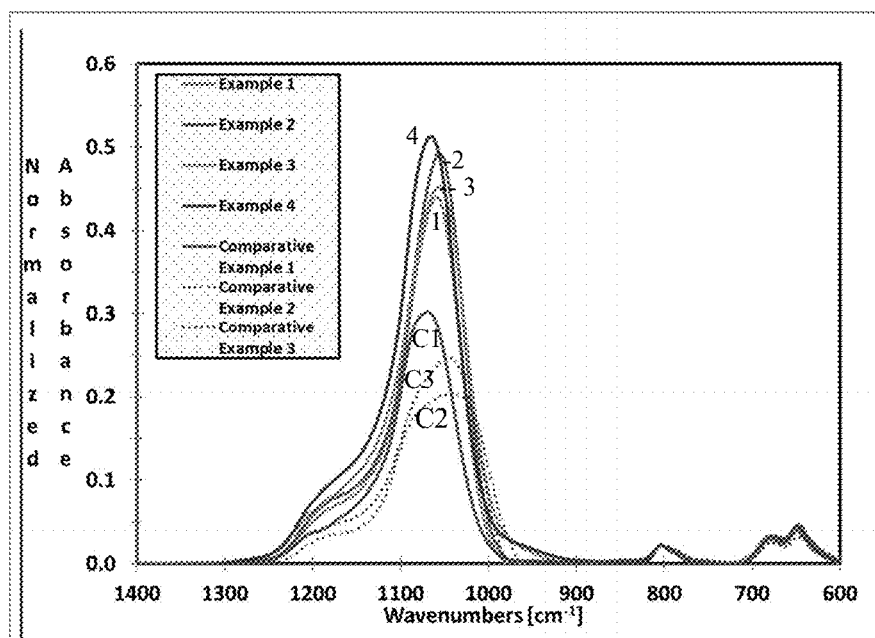
FIG. 13B shows the same spectra normalized based on Si—O—Si symmetric stretch from 765 to 845 cm$^{-1}$.

FTIR ATR Spectroscopy Measurements:

FTIR spectra were obtained on calcined samples using a single bounce diamond attenuated total reflectance (ATR) accessory on a Nicolet spectrometer from Thermo Scientific. As shown in FIG. 13A, FTIR spectra for the samples prepared using the disclosed method exhibited an intense peak between 1030-1080 $cm^{-1}$, which is much higher than those of the products prepared from prior art (FIG. 13A). The peak near 1030-1080 $cm^{-1}$ is a characteristic of the phonon vibration of coupled Si—O—Si oscillators in the crystal lattice, which was from the Si—O—Si asymmetric stretch. The FTIR spectra were also normalized based on the peak near 805 $cm^{-1}$ (FIG. 13B), which was from Si—O—Si symmetric stretch. The ratio of the peak area of the peak between 900-1300 $cm^{-1}$ and the peak between 765-845 $cm^{-1}$ was compared in Table 5. As shown in Table 5, the peak area ratios are measured to be 72, 85, 94, and 84 respectively for Examples 1, 2, 3, and 4 prepared using the disclosed method. For the Comparative examples, the ratios are all below 51 and are all substantially lower than those of the inventive samples. These data indicate that CHA zeolite samples prepared using the disclosed methods are different from the comparative examples.

Figure 14:
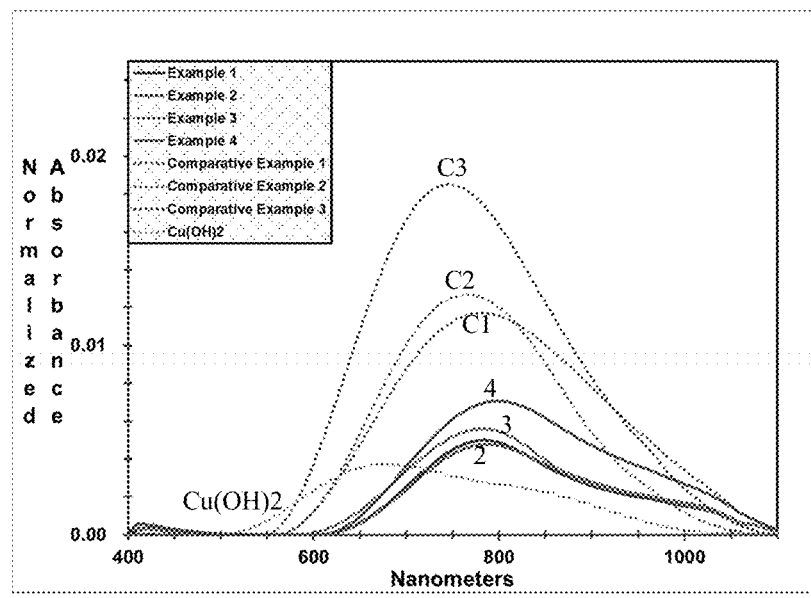
FIG. 14 shows Fourier-transform visible spectrum (FT-VIS) of calcined Examples 1-4 and Comparative Examples 1-3 normalized based on 1 wt. % CuO content with a Cu(OH)$_2$ powder as a reference.

FT-VIS Spectroscopy Measurements:

FT-VIS spectra were collected on calcined samples on a Bruker Vertex 80 spectrometer under diffuse reflectance conditions utilizing a Harrick praying mantis diffuse reflectance accessory. The background sample PTFE was used as a reference material for background scans. FIG. 14 shows FT-VIS spectra for the samples normalized to 1 wt. % CuO content. FIG. 14 also includes a $Cu(OH)_2$ powder as a reference. As shown in FIG. 14, the samples prepared using the disclosed method exhibited much lower peak areas in the 500-1100 nm range than those of the products prepared from prior art. The ratios of peak area of each sample relative to the reference $Cu(OH)_2$ peak area are compared in Table 6. The ratios are below 1.7 for Examples 1, 2, 3, and 4 prepared using the disclosed method and are higher than 2.8 for the Comparative examples.

Surface Area Measurements:

Surface area was determined in accordance with the BET (Brunauer-Emmett-Teller) nitrogen adsorption method. The general procedure and guidance of ASTM D4365-95 is followed in the application of the BET method to the materials according to the present disclosure. To ensure a consistent state of the sample to be measured, all samples are pretreated. Suitable pretreatment involves heating the sample, such as to a temperature of 400 to 500° C., for a time sufficient to eliminate free water, such as 3 to 5 hours. In one embodiment, the pretreatment comprises heating each sample to 500° C. for 4 hours.

Micropore Volume Measurements:

The assessment of micropore volume is particularly derived from the BET measurement techniques by an evaluation method called the t-plot method (or sometimes just termed the t-method) as described in the literature (Journal of Catalysis 1964, 3, 32).

TABLE 1

Analytical data for samples prepared from methods described in this patent application compared to comparative examples.

| Example | From | SAR | CuO wt. % | $Na_2O$ + $K_2O$ wt. % | SA $m^2$/g | MPV cc/g |
|---|---|---|---|---|---|---|
| Inventive 1 | | 22.2 | 3.7 | 0.08 | 707 | 0.27 |
| Inventive 2 | | 21.4 | 4.3 | 0.11 | 733 | 0.27 |

TABLE 1-continued

Analytical data for samples prepared from methods described in this patent application compared to comparative examples.

| Example | From | SAR | CuO wt. % | Na₂O + K₂O wt. % | SA m²/g | MPV cc/g |
|---|---|---|---|---|---|---|
| Inventive 3 | | 16.6 | 4.1 | 0.20 | 760 | 0.28 |
| Inventive 4 | | 23.6 | 3.6 | 0.05 | 750 | 0.27 |
| Comparative 1 | U.S. Pat. No. 8,715,618 | 26.0 | 3.1 | 0.08 | 681 | 0.25 |
| Comparative 2 | US 2016/0271596 | 28.9 | 5.7 | 0.64 | 727 | 0.27 |
| Comparative 3 | US 2015/0151286 | 21.0 | 2.9 | 0.04 | 671 | 0.22 |

TABLE 2

SCR activity (NO conversion at temperatures from 150-550° C.) over fresh samples prepared from method described in this patent application compared to samples prepared from prior reported methods.

| | | Temperature (° C.) | | | | | | |
|---|---|---|---|---|---|---|---|---|
| Example | From | 150 | 175 | 200 | 250 | 350 | 450 | 550 |
| | | NO conversion (%) | | | | | | |
| Inventive 1 | | 55.8 | 87.6 | 98.8 | 100 | 100 | 90.5 | 69.9 |
| Inventive 2 | | 78.1 | 99.3 | 100 | 100 | 100 | 94.9 | 74.0 |
| Inventive 3 | | 76.0 | 96.8 | 99.7 | 100 | 100 | 94.2 | 82.5 |
| Inventive 4 | | 68.6 | 96.9 | 99.7 | 100 | 100 | 88.4 | 82.0 |
| Comparative 1 | U.S. Pat. No. 8,715,618 | 39.5 | 70.3 | 93.9 | 99.9 | 99.4 | 87.8 | 75.2 |
| Comparative 2 | US 2016/0271596 | 37.0 | 63.0 | 91.6 | 100 | 99.9 | 87.8 | 67.5 |
| Comparative 3 | US 2015/0151286 | 37.8 | 64.1 | 87.2 | 99.5 | 99.6 | 87.9 | 76.8 |

TABLE 3

SCR activity (NO conversion at temperatures from 150-550° C.) over steamed samples prepared from method described in this patent application compared to samples prepared from prior reported methods. Steaming conditions: 750 C., 10% H₂O/air, 16 hours.

| | | Temperature (° C.) | | | | | | |
|---|---|---|---|---|---|---|---|---|
| Example | From | 150 | 175 | 200 | 250 | 350 | 450 | 550 |
| | | NO conversion (%) | | | | | | |
| Inventive 1 | | 38.3 | 65.7 | 92.3 | 99.4 | 95.3 | 81.7 | 62.1 |
| Inventive 2 | | 41.4 | 71.4 | 93.7 | 99.7 | 96.1 | 82.8 | 62.4 |
| Inventive 3 | | 35.3 | 61.6 | 89.2 | 98.6 | 94.9 | 85.5 | 68.7 |
| Inventive 4 | | 40.3 | 79.1 | 98.7 | 100 | 100 | 90.9 | 75.9 |
| Comparative 1 | U.S. Pat. No. 8,715,618 | 28.3 | 56.2 | 93.0 | 99.8 | 93.3 | 81.6 | 59.2 |
| Comparative 2 | US 2016/0271596 | 24.0 | 42.5 | 67.2 | 96.1 | 90.9 | 74.8 | 43.3 |
| Comparative 3 | US 2015/0151286 | 26.5 | 53.4 | 87.3 | 98.3 | 91.2 | 79.4 | 62.4 |

TABLE 4

The ratio of the [3, 1, 0] peak area and the total peak doublet area ([3, 1, 0] + [3, −1, −1]).

| Examples | area of [3, 1, 0] peak/total area ([3, 1, 0] peak + [3, −1, −1] peak) |
|---|---|
| Inventive 1 | 0.19 |
| Inventive 2 | 0.18 |
| Inventive 3 | 0.26 |
| Inventive 4 | 0.21 |
| Comparative 1 | 0.12 |
| Comparative 2 | 0.12 |
| Comparative 3 | 0.09 |

TABLE 5

The ratio of the peak area of the peak between 900-1300 cm⁻¹ and the peak between 765-845 cm⁻¹ for Inventive examples and comparative examples.

| Examples | Peak area between 900-1300 cm⁻¹/peak area between 765-845 cm⁻¹ |
|---|---|
| Inventive 1 | 72 |
| Inventive 2 | 85 |
| Inventive 3 | 94 |
| Inventive 4 | 84 |
| Comparative 1 | 51 |
| Comparative 2 | 41 |
| Comparative 3 | 47 |

TABLE 6

The ratio of the peak area of Inventive examples
and Comparative examples between 500-1100 nm relative
to the peak area of the reference Cu(OH)$_2$

| Examples | Peak area/Reference Cu(OH)$_2$ peak area |
|---|---|
| Inventive 1 | 1.1 |
| Inventive 2 | 1.1 |
| Inventive 3 | 1.3 |
| Inventive 4 | 1.7 |
| Comparative 1 | 3.1 |
| Comparative 2 | 2.8 |
| Comparative 3 | 4.5 |

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure.

Other embodiments of the invention will be apparent to those skilled in the art from consideration of the specification and practice of the invention disclosed herein. It is intended that the specification and examples be considered as exemplary only, with the true scope of the invention being indicated by the following claims.

What is claimed is:

1. A metal-containing chabazite zeolite, wherein said zeolite has an FTIR peak area ratio between the peak at 900-1300 cm-1 and the peak at 765-845 cm-1 (~805 cm-1 is Si—O—Si symmetric stretch) of at least 55.

2. The zeolite of claim 1, wherein said zeolite has a silica-to-alumina ratio (SAR) ranging from 5 to 60.

3. The zeolite of claim 1, wherein the metal is copper.

4. The zeolite of claim 3, wherein the copper is present in an amount of at least 0.5 weight percent of the total weight of the material.

5. The zeolite of claim 4, wherein the copper comprises an amount ranging from 0.5 to 10 weight percent of the total weight of the material.

6. The zeolite of claim 1, wherein the metal is iron.

7. The zeolite of claim 6, wherein the iron is present in an amount of at least 0.5 weight percent of the total weight of the material.

8. The zeolite of claim 7, wherein the iron comprises an amount ranging from 0.5 to 10 weight percent of the total weight of the material.

9. The zeolite of claim 1, wherein the zeolite has a total alkali oxide amount of less than 0.3 weight percent.

10. The zeolite of claim 1, wherein the peak area ratio between the FT-VIS peak between 500-1100 nm and the FT-VIS peak area of Cu(OH)2 between 500-1100 nm is lower than 2.5.

11. A method of selective catalytic reduction (SCR) of NOx in exhaust gas, said method comprising contacting exhaust gas with a zeolitic material comprising a copper containing CHA-type zeolite, wherein said material has an FTIR peak area ratio between the peak at 900-1300 cm-1 and the peak at 765-845 cm-1 (~805 cm-1 is Si—O—Si symmetric stretch) of at least 55.

12. The method of claim 11, wherein said contacting step is performed in the presence of ammonia or urea.

13. A method of making a microporous crystalline material from reaction mixtures that are essentially void of alkali metal cations and comprise organic structure directing agents (OSDA) selected from the group consisting of (1) metal-polyamine as the first OSDA, (2) N,N,N-trimethyl-1-adamantyl ammonium (TMAda+), or trimethylbenzylammonium (TMBA+) or N,N,N-dimethylethylcyclohexylammonium (DMECHA+) organic or mixtures thereof as the second OSDA, and (3) TMA+ or TEA+ or mixtures thereof as the third OSDA, the method comprising:
a) mixing sources of alumina, silica, water, a first OSDA, a second OSDA and optionally a third OSDA and optionally a seed material to form a gel;
b) heating the gel in a vessel at a temperature ranging from 80° C. to 250° C. to form a crystalline chabazite product that exhibits an XRD peak area ratio between the [3,1,0] peak and the peak doublet (sum of [3,−1,−1] peak and [3,1,0] peak) of at least 0.15; and
c) calcining the product to produce an aluminosilicate zeolite having a CHA structure, and a silica-to-alumina ratio (SAR) ranging from 5 to 60.

14. The method of claim 13, wherein the reaction mixture has a molar composition of 1 SiO2:m Al2O3:n metal-polyamine:x TMAdaOH:y TMAOH:z H2O, where m=0.016-0.2, n=0.01-0.12, x=0.01-0.50, y=0.01-0.50, z=1-50.

15. The method of claim 13, wherein the metals used for forming metal-polyamine of the first OSDA are selected from Cu, Fe, Mn, Co, Ni, Pd, Pt and Zn.

16. The method of claim 13, wherein the polyamine of the first OSDA is selected from diethylenetriamine, triethylenetetramine, tetraethylenepentamine, pentaethylenehexamine, N, N-(2-hydroxyethyl) ethylenediamine, N,N-bis(2-aminoethyl)-1,3-propanediamine, 1,2-bis(3-aminopropylamino), 1,4,8,11-tetraazacyclotetradecane, 1,4,8,11-tetramethyl-1,4,8,11-tetraazacyclotetradecane, and combinations thereof.

17. The method of claim 16, wherein the polyamine is tetraethylenepentamine (TEPA).

18. The method of claim 13, wherein the source of alumina is chosen from aluminum trihydroxide, alumina, pseudoboehmite alumina, silica-alumina and Al isopropoxide.

19. The method of claim 13, wherein the source of silica is chosen from silica sol, silica gel, precipitated silica, silica-alumina and fumed silica.

* * * * *